(12) United States Patent
Zheng et al.

(10) Patent No.: US 11,152,012 B2
(45) Date of Patent: Oct. 19, 2021

(54) ACOUSTIC ZOOMING

(71) Applicant: Snap Inc., Santa Monica, CA (US)

(72) Inventors: Changxi Zheng, New York, NY (US); Arun Asokan Nair, Baltimore, MD (US); Austin Reiter, Southport, CT (US); Shree K. Nayar, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/250,763

(22) PCT Filed: Aug. 30, 2019

(86) PCT No.: PCT/US2019/049069
§ 371 (c)(1),
(2) Date: Mar. 2, 2021

(87) PCT Pub. No.: WO2020/051086
PCT Pub. Date: Mar. 12, 2020

(65) Prior Publication Data
US 2021/0217432 A1    Jul. 15, 2021

(30) Foreign Application Priority Data
Sep. 3, 2018  (IN) .............................. 201811032980

(51) Int. Cl.
*G10L 21/0232* (2013.01)
*G10L 25/30* (2013.01)
(Continued)

(52) U.S. Cl.
CPC .......... *G10L 21/0232* (2013.01); *G10L 25/30* (2013.01); *G10L 25/57* (2013.01); *H04R 1/406* (2013.01); *G10L 2021/02166* (2013.01)

(58) Field of Classification Search
None
See application file for complete search history.

(56) References Cited

U.S. PATENT DOCUMENTS 4,862,278 A    8/1989  Dann et al.
9,282,399 B2 *  3/2016  Kim ...................... H04R 1/326
(Continued)

FOREIGN PATENT DOCUMENTS

WO    WO-2020051086 A1    3/2020

OTHER PUBLICATIONS

"International Application Serial No. PCT/US2019/049069, International Search Report dated Nov. 18, 2019", 2 pgs.
(Continued)

*Primary Examiner* — Paul W Huber
(74) *Attorney, Agent, or Firm* — Schwegman Lundberg & Woessner, P.A.

(57) ABSTRACT

Method of performing acoustic zooming starts with microphones capturing acoustic signals associated with video content. Beamformers generate beamformer signals using the acoustic signals. Beamformer signals correspond respectively to tiles of video content. Each of the beamformers is respectively directed to a center of each of the tiles. Target enhanced signal is generated using beamformer signals. Target enhanced signal is associated with a zoom area of video content. Target enhanced signal is generated by identifying the tiles respectively having at least portions that are included in the zoom area, selecting beamformer signals corresponding to identified tiles, and combining selected beamformer signals to generate target enhanced signal. Combining selected beamformer signals may include determining proportions for each of the identified tiles in relation to the zoom area and combining selected beamformer signals based on the proportions to generate the target enhanced signal. Other embodiments are described herein.

20 Claims, 13 Drawing Sheets

(51) Int. Cl.
*H04R 1/40* (2006.01)
*G10L 25/57* (2013.01)
*G10L 21/0216* (2013.01)

(56) References Cited

U.S. PATENT DOCUMENTS

| | | |
|---|---|---|
| 2011/0129095 A1 | 6/2011 | Avendano et al. |
| 2012/0082322 A1 | 4/2012 | Van Waterschoot et al. |
| 2012/0288114 A1 | 11/2012 | Duraiswami et al. |
| 2013/0272548 A1 | 10/2013 | Kim et al. |
| 2013/0342731 A1* | 12/2013 | Lee .................. H04N 5/232127 |
| | | 348/231.4 |
| 2014/0270245 A1 | 9/2014 | Elko et al. |
| 2016/0061951 A1 | 3/2016 | Brown et al. |

OTHER PUBLICATIONS

"International Application Serial No. PCT/US2019/049069, Written Opinion dated Nov. 18, 2019", 5 pgs.
"International Application Serial No. PCT/US2019/049069, International Preliminary Report on Patentability dated Mar. 18, 2021", 7 pgs.

* cited by examiner $S_{BF,1}(t) *$ $+S_{BF,2}(t) *$ $+S_{BF,3}(t) *$ $+S_{BF,4}(t) *$ $S_{BF}(t) =$

ACOUSTIC ZOOMING

PRIORITY

This application is a U.S. national-phase application filed under 35 U.S.C. § 371 from International Application Serial No. PCT/US2019/049069, filed on Aug. 30, 2019, and published as WO 2020/051086 on Mar. 12, 2020, which claims the benefit of priority to Indian Patent Application Serial No. 201811032980, filed on Sep. 3, 2018, the benefit of priority of each of which is claimed hereby, and each of which is incorporated by reference herein in its entirety.

BACKGROUND

Currently, a number of consumer electronic devices are adapted to capture audio and/or video content. For example, a user can use his mobile device to quickly capture a video while he is in public.

During playback of a video, the viewer may zoom into an area of interest to see in a larger format the selected area of interest. However, if the environment in which the video was captured is noisy, the audio related to the area of interest in the video may have been drowned out.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments described herein improve on current systems by allowing for acoustic zooming to be performed during video playback. Specifically, acoustic zooming refers to enhancing the audio related to an area of interest in a video. For example, when a user visually zooms into an area of interest in the video during playback, the area of interest can be enhanced visually (e.g., larger format) and the audio corresponding to that area of interest is also enhanced by increasing the volume originating from that area of interest, suppressing sounds originating from outside that area of interest (e.g., environmental noise, other speakers, etc.), or any combination thereof.

Figure 1:
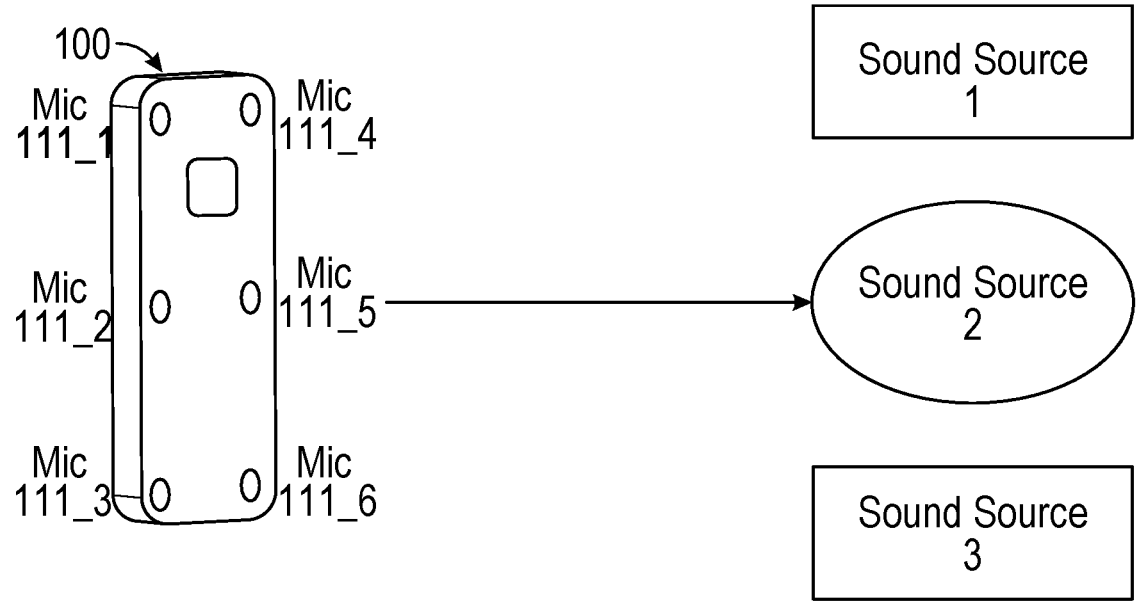
FIG. 1 is an example of a system for performing acoustic zooming in use according to one example embodiment.

FIG. 1 is an example of a system for performing acoustic zooming in use according to one example embodiment. As shown in FIG. 1, the system 100 may be an apparatus such as a client device (e.g., machine 1000 in FIG. 10) that captures a video including a plurality of subjects as well as acoustic signals that correspond to the video.

As used herein, the term "client device" may refer to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

Some embodiments may include one or more wearable devices, such as a pendant with an integrated camera that is integrated with, in communication with, or coupled to, a client device. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, or any other wearable devices.

Figure 2:
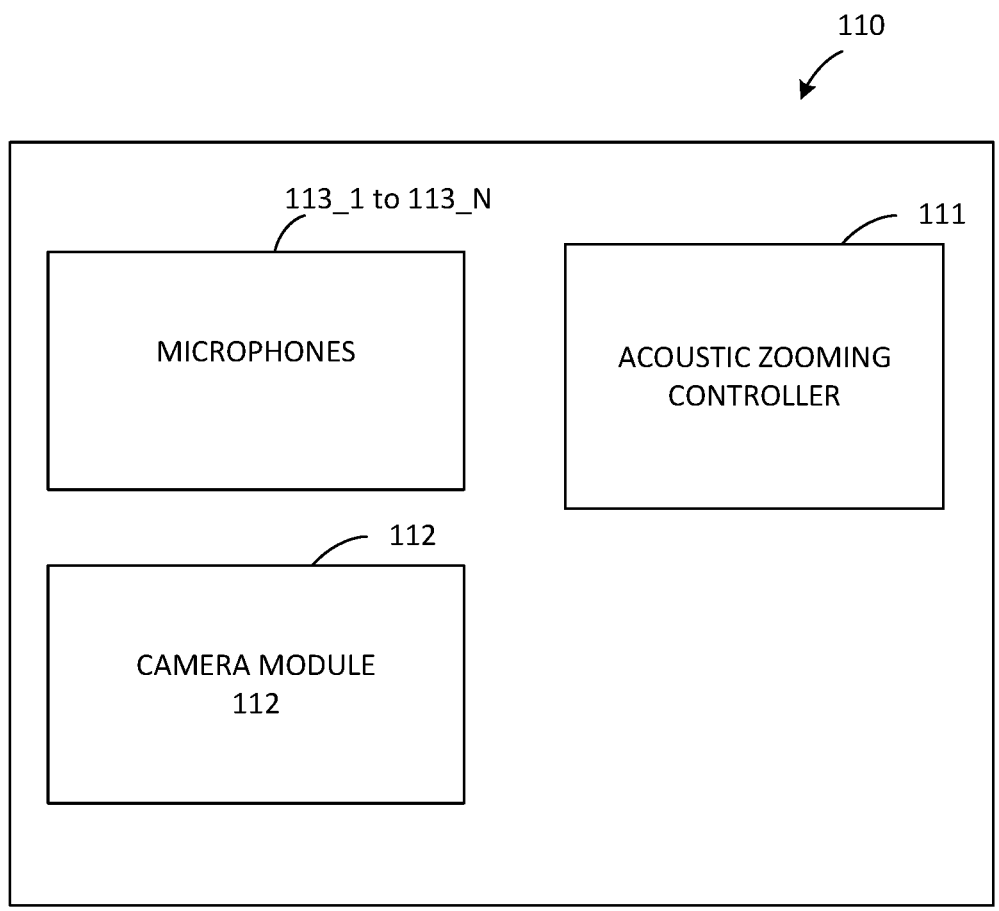
FIG. 2 is block diagram illustrating further details of the system from FIG. 1, according to one example embodiment.

FIG. 2 is block diagram illustrating further details of the system 100 according to one example embodiment. System 100, as shown in FIG. 2, includes microphones 113_1 to 113_N (N>1), a camera module 112, and an acoustic zooming controller 111. The microphones 113_1 to 113_N may be air interface sound pickup devices that convert sound into an electrical signal. While, in FIG. 1, the system 100 includes six microphones 113_1 to 113_6, the number of microphones may vary. In one embodiment, the system 100 may include at least two microphones and may form a microphone array.

The microphones 113_1 to 113_N may be used to create microphone array beams (i.e., beamformers) which can be steered to a given direction by emphasizing and deemphasizing selected microphones 113_1 to 113_N. Similarly, the microphone arrays can also exhibit or provide nulls in other given directions. Accordingly, the beamforming process, also referred to as spatial filtering, may be a signal processing technique using the microphone array for directional sound reception.

The camera module 112 includes a camera lens and an image sensor. The camera lens may be a perspective camera lens or a non-perspective camera lens. A non-perspective camera lens may be, for example, a fisheye lens, a wide-angle lens, an omnidirectional lens, etc. The image sensor captures digital video through the camera lens. The images may be also be still image frame or a video including a plurality of still image frames. In one embodiment, the system 100 may be separate from the camera module 112 but coupled to a client device including the camera module 112. In this embodiment, the system 100 may be a housing or case that includes the microphones 113_1 to 113_N and a window allowing the camera lens to capture image or video content.

In the embodiment in FIG. 1, the system 100 uses the camera module 112 to capture a video including a plurality of subjects and uses the microphones 113_1 to 113_N to capture acoustic signals that correspond to the video. During playback, the acoustic signals are synchronized in time with the video. The acoustic signals may include desired (or target) audio signal as well as ambient or environmental noise. For example, in FIG. 1, if the user of system 100 intends to capture the audio signal from the source in the center, audio signals from the remaining sources (e.g., top and bottom sources) will also be captured as environmental noise signals.

In one embodiment, when playing back the captured video and the corresponding audio signals, the acoustic zooming controller 111 in system 100 determines the field of view (or zoom area) of the video content and enhances the audio signal corresponding that field of view. In another embodiment, the acoustic zooming controller 111 determines the field of view (or zoom area) of the video content in real-time and enhances the audio signal corresponding that field of view in real-time.

Figure 3:
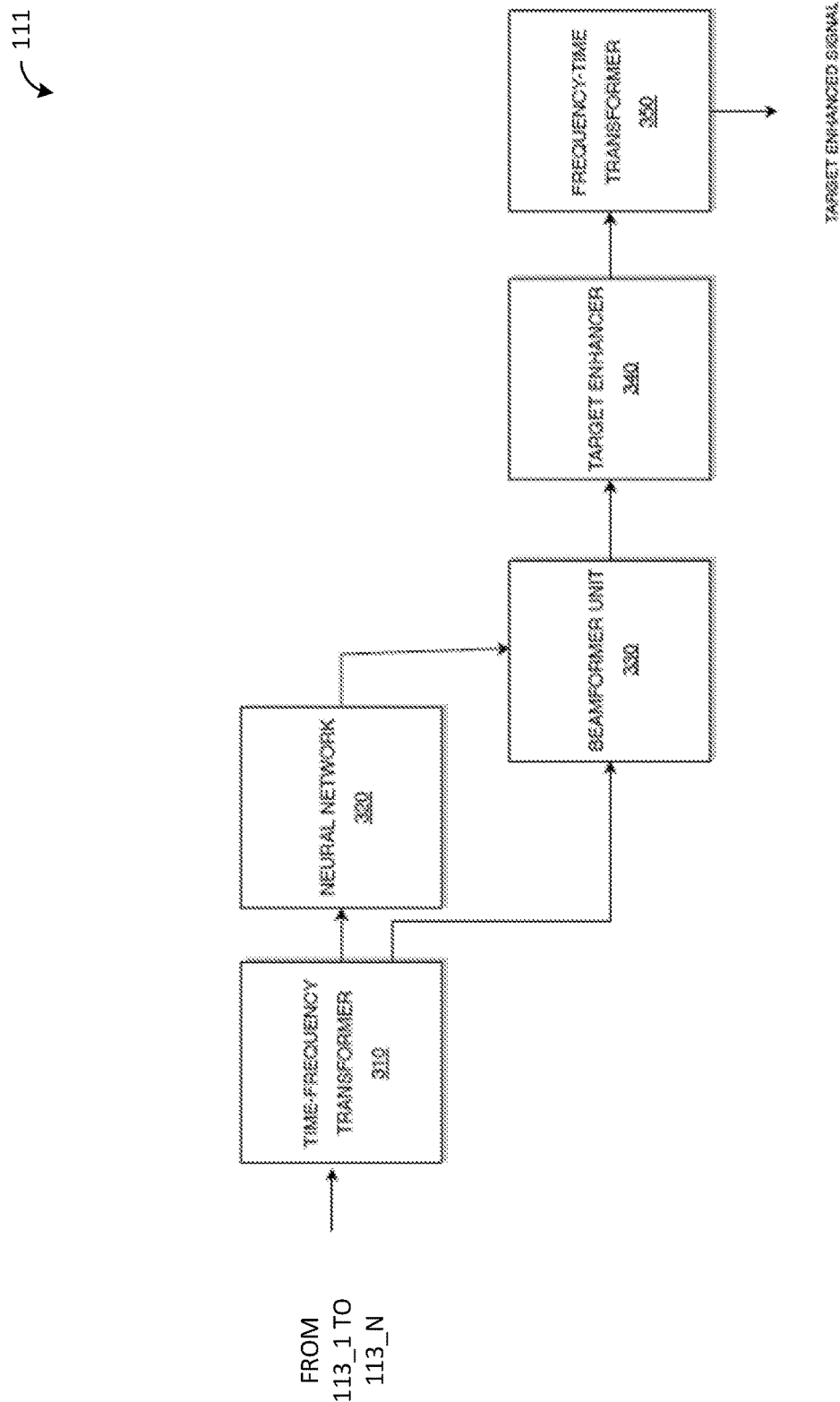
FIG. 3 is a block diagram of the details of the acoustic zooming controller 111 in FIG. 2 of the system according to one example embodiment.

FIG. 3 is a block diagram of the details of the acoustic zooming controller 111 in FIG. 2 of the system according to one example embodiment. In FIG. 3, the acoustic zooming controller 111 includes a time-frequency transformer 310, a neural network 320, a beamformer unit 330 that includes a plurality of beamformers, a target enhancer 340 and a frequency-time transformer 350.

The time-frequency transformer 310 receives the acoustic signals from the microphones 113_1 to 113_N and transforms the acoustic signals from a time domain to a frequency domain. In one embodiment, the time-frequency transformer 310 performs a Short-Time Fourier Transform (STFT) on the acoustic signals in a time domain to obtain the acoustic signals in a frequency domain.

The neural network 320 receives the acoustic signals in the frequency domain and generates a noise reference signal. The neural network 320 may be a deep neural network used to generate a noise reference signal that estimates the noise covariance matrix which encodes the energy distribution of noise in space. The neural network 320 may be offline trained to recognize and encode the distribution of noise in space.

In one embodiment, the neural network 320 is also used to mask out the noise in the acoustic signals in the frequency domain to generate acoustic signals in the frequency domain that are noise-suppressed. The neural network 320 can also provide the acoustic signals in the frequency domain that are noise-suppressed to the beamformer unit 330 for further processing.

Figure 4A:
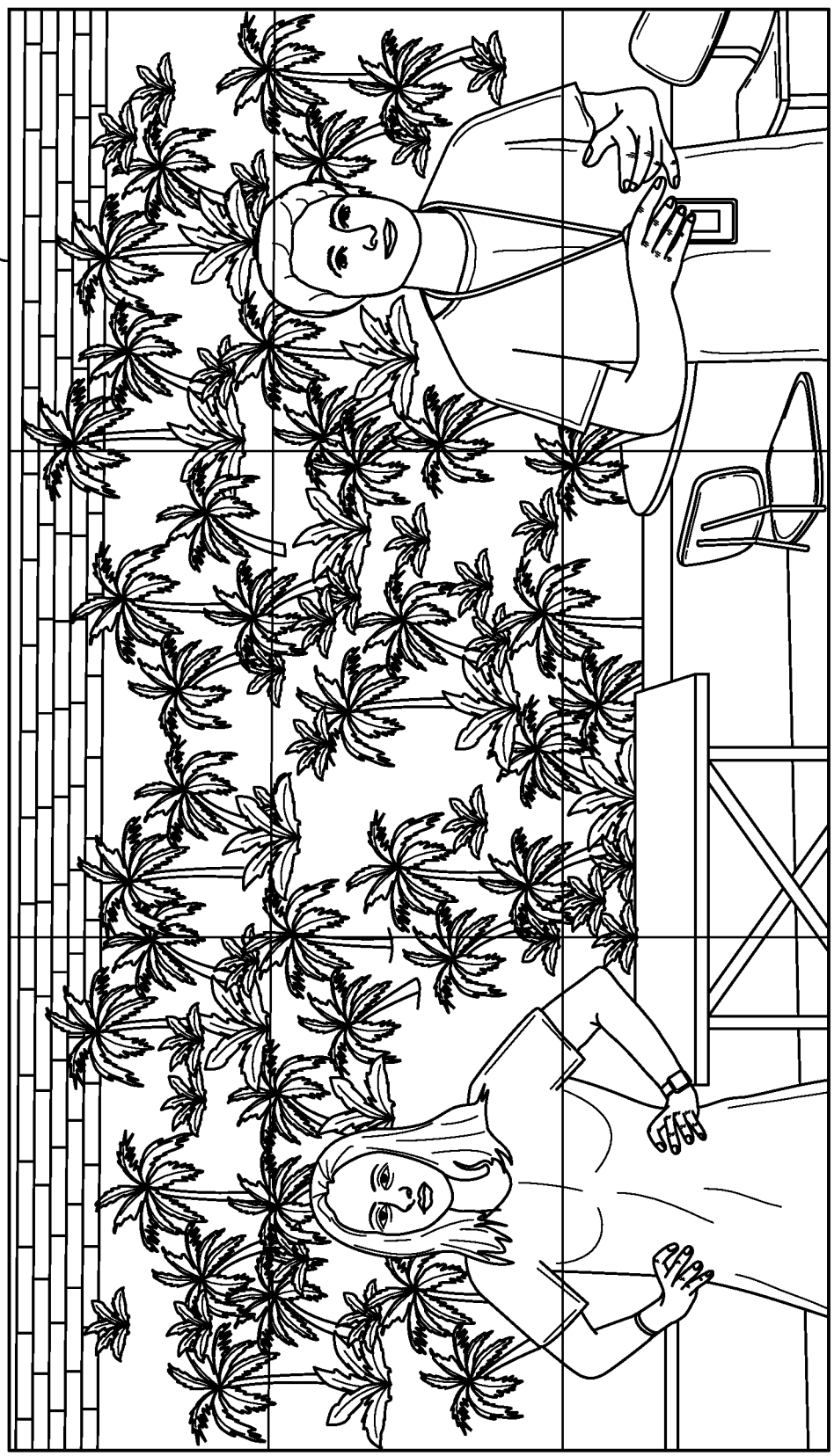
FIG. 4A-D illustrate examples of an arrangement of tiles on a video content (FIG. 4A), a zoom area on the arrangement of tiles (FIG. 4B) and combining beamformer signals based on tiles included in the zoom area (FIG. 4C-4D) according to embodiments of the present invention.

FIG. 4A illustrates an example of an arrangement of tiles on a video content according to one embodiment. The video content that is captured may be divided into a plurality of tiles 410_1 to 410_M (M>1). In the embodiment in FIG. 4A, the tiles of video content are equally-shaped tiles having an angular width of at least 10 degrees. For each tile 410_j (M≥j≥1), the beamformer unit 330 includes a beamformer that is directed to the center of the tile 410_j. In the embodiment in FIG. 4A, the beamformer unit 330 includes a nine (9) beamformers that are respectively directed or steered to the nine (9) centers of nine (9) tiles. Accordingly, the beamformers each generate a beamformer signal that includes the audio corresponding to the portion of video content in each tile. The beamformers in beamformer unit 330 can include fixed beamformers that are directed to the center of the tiles 410_j, adaptive beamformers such as Minimum Variance Distortionless Response (MVDR) beamformers, or any combination thereof.

While the embodiment in FIG. 4A includes equally-shaped tiles 410_1 to 410_M, it is understood that the tiles 410_1 to 410_M can be of different arbitrary shapes. Similarly, while the embodiment in FIG. 4A includes the tiles 410_1 to 410_M having an angular width of at least 10 degrees, it is understood that the tiles 410_1 to 410_M can have different angular widths.

Figure 4B:
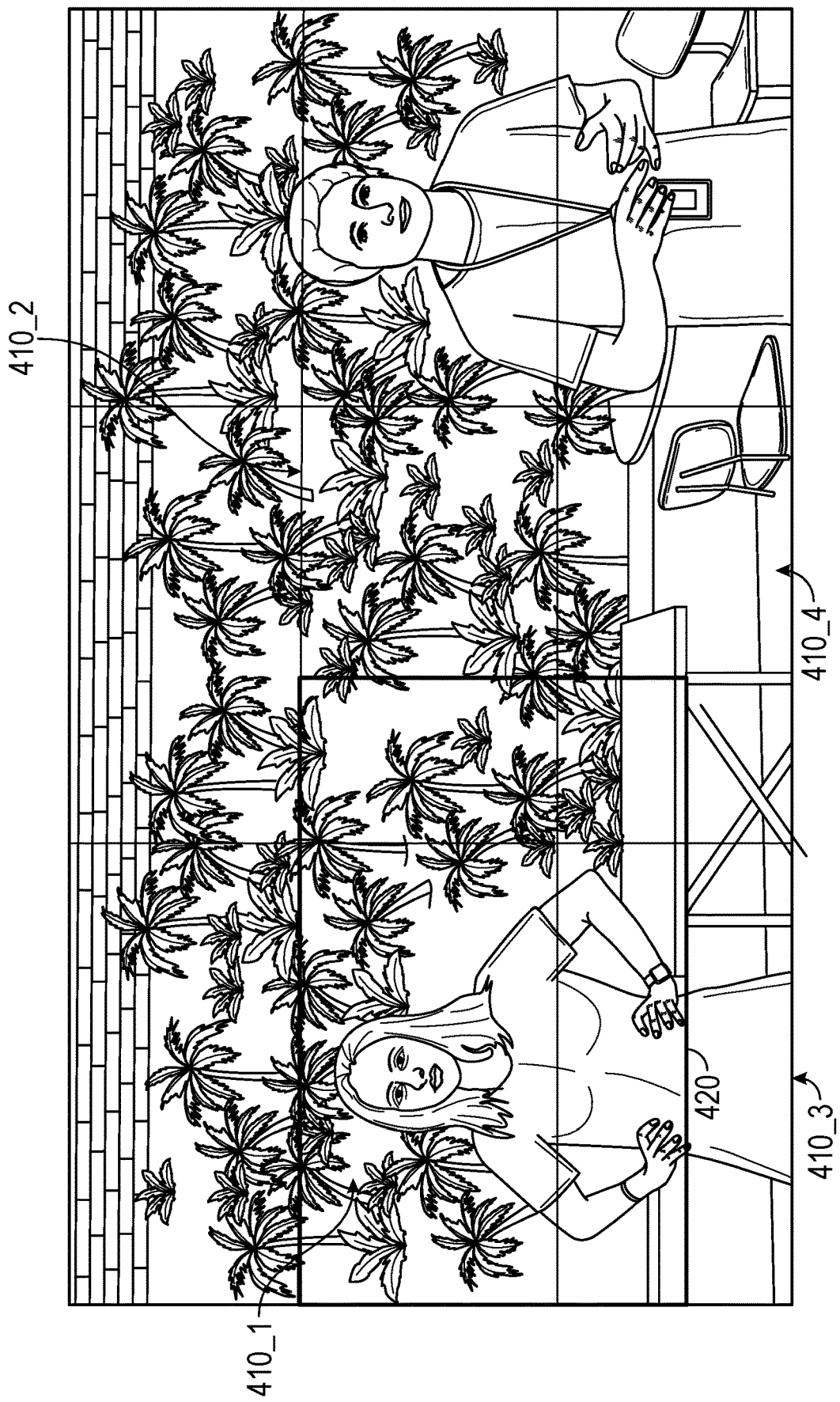

FIG. 4B illustrates a zoom area 420 on the arrangement of tiles from FIG. 4A according to one embodiment. When a user selects an area of the video content to be displayed in a larger (zoomed) format, the field of view of the user is altered from the first field of view including all the tiles in FIG. 4A to a second field of view corresponding to the zoom area 420 in FIG. 4B that includes portions of different tiles.

Figure 4C:
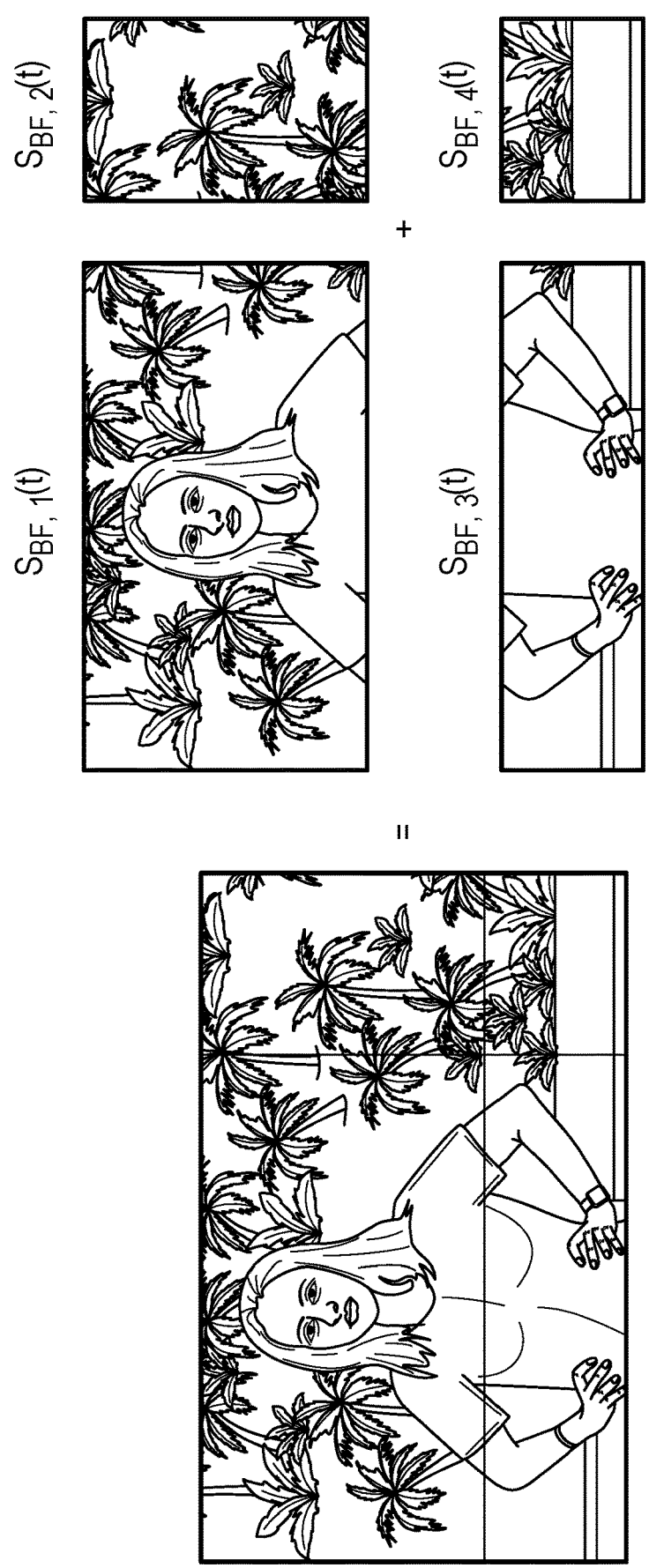

The target enhancer 340 in FIG. 3 receives the plurality of beamformer signals from the beamformer unit 330 and generates a target enhanced signal associated with the zoom area 420 of the video content. In one embodiment, the target enhancer 340 generates the target enhanced signal by identifying the tiles respectively having at least portions that are included in the zoom area 420. In FIG. 4C, portions of four tiles 410_1 to 410_4 are identified as having at least portions that are included in the zoom area 420. In this example, the entire tile 410_1 is included in the zoom area 420 and smaller portions of tiles 410_2 to 410_4 are included in the zoom area 420. The target enhancer 340 selects the beamformer signals that correspond to the identified tiles 410_2 to 410_4 and combines the selected beamformer signals to generate the target enhanced signal.

Figure 4D:
Figure 4D:
Figure 4D:
Figure 4D:
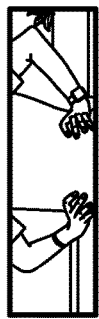
Figure 4D:
Figure 4D:

In one embodiment, the target enhancer 340 combines the selected beamformer signals in the same proportion as each of the identified tiles contribution to the zoom area. FIG. 4D illustrates the combination performed by the target enhancer 340 according to one embodiment. The target enhancer 340 in this embodiment determines proportions for each of the identified tiles in relation to the zoom area 420 and combines the selected beamformer signals based on the proportions to generate the target enhanced signal. The target enhancer 340 may combine the selected beamformer signals by spectrally adding the selected beamformer signals based on the proportions.

The frequency-time transformer 350 receives the target enhanced signal from the target enhancer 340 and transforms the target enhanced signal from a frequency domain to a time domain. In one embodiment, the frequency-time transformer 350 performs an Inverse Short-Time Fourier Transform (STFT) on the target enhanced signal in a frequency domain to obtain the target enhanced signal in a time domain.

Figure 5:
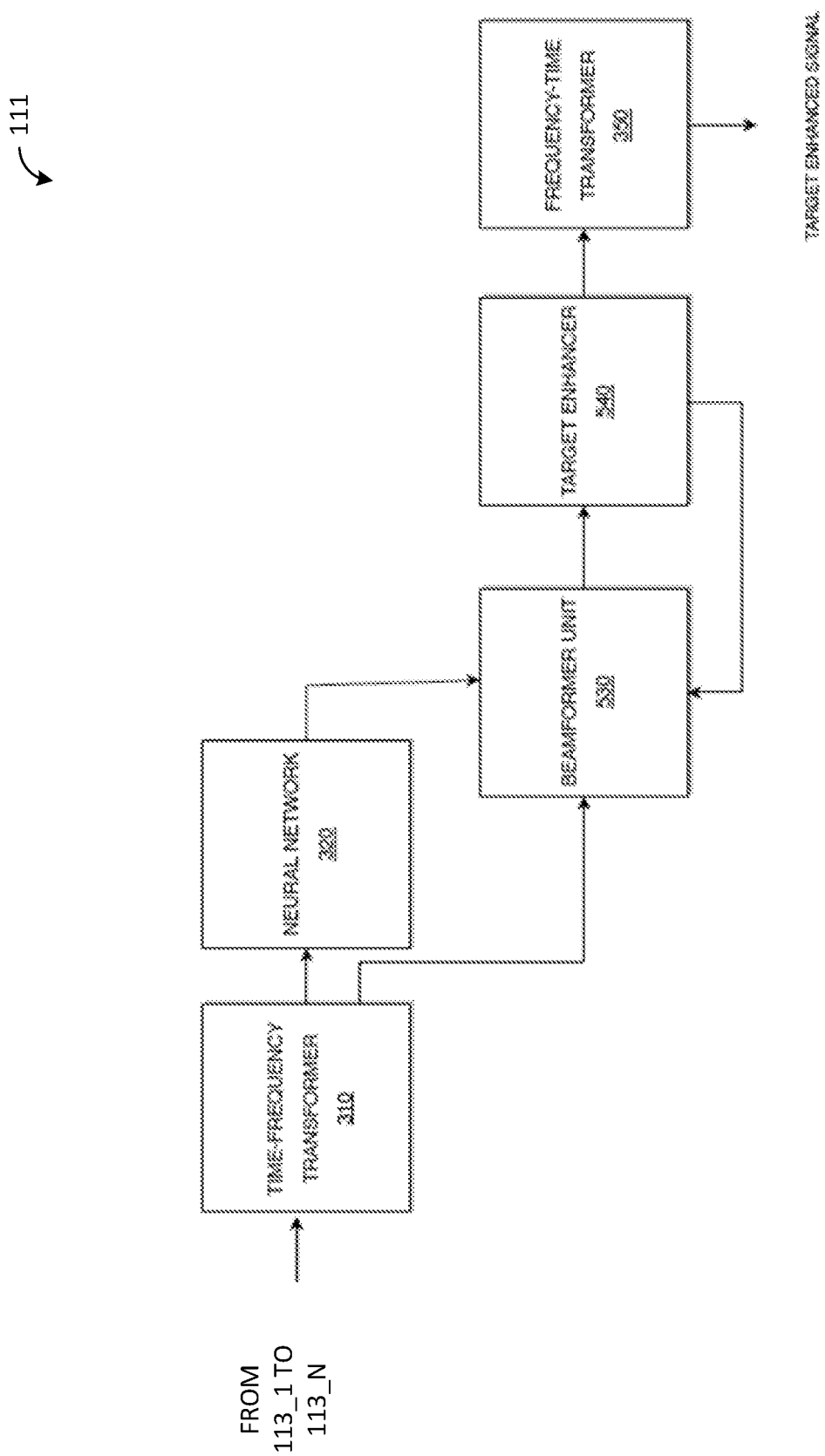
FIG. 5 is a block diagram of the details of the acoustic zooming controller 111 in FIG. 2 of the system according to one example embodiment.

FIG. 5 is a block diagram of the details of the acoustic zooming controller 111 in FIG. 2 of the system according to one example embodiment. Similar to details of the acoustic zooming controller 111 in FIG. 3, the acoustic zooming controller 111 in FIG. 5 also includes the time-frequency transformer 310, the neural network 320, and the frequency-time transformer 350. However, in this embodiment, the acoustic zooming controller 111 includes a beamformer unit 530 that includes a target beamformer and a noise beamformer and a target enhancer 540 that includes a feedback signal to the beamformer unit 530. The beamformer unit 530 receives the acoustic signals in the frequency domain from the time-frequency transformer 310 and the noise reference signal from the neural network 320.

Figure 6:
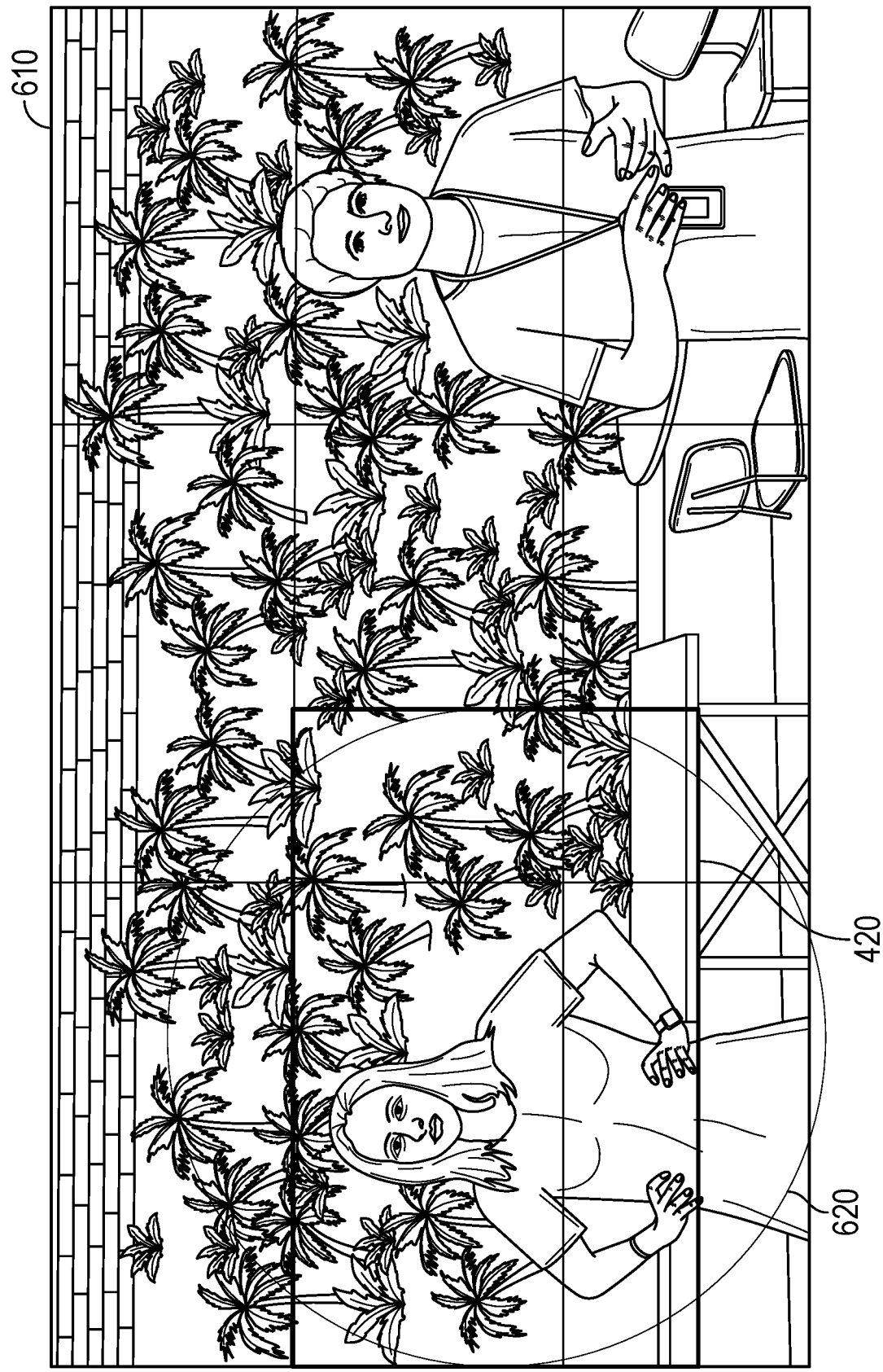
FIG. 6 illustrate examples of a zoom area on a video content and a field of view cone centered on the zoom area according to an embodiment of the present invention.

FIG. 6 illustrate examples of a zoom area on a video content and a field of view circle 620 centered on the zoom area 420 according to an embodiment of the present invention. When a user selects the zoom area 420 of the video content to be displayed in a larger (zoomed) format, the field of view of the user is altered from the first field of view of the whole area 610 of the video content in FIG. 6 to a second field of view corresponding to the zoom area 420 in FIG. 6. While FIG. 6 includes the second field of view as a circle 620, the second field of view may be any shape.

In one embodiment, the beamformer unit 530 includes a target beamformer and a noise beamformer. The target beamformer is directed at a center of a second field of view circle 620 corresponding to a zoom area 420 of the video content. In one embodiment, the second field of view circle 620 is an attempt to cover as much of the zoom area 420 as possible. In one embodiment, the target beamformer implements a steering vector that encodes the direction of the sound to be enhanced (e.g., the center of the second field of view circle 620). The noise beamformer is directed at the first field of view 610 and has a null directed at the center of the second field of view circle 620. The noise beamformer may be a cardioid or other beamforming pattern that is directed away from the center of the second field of view circle 620 to capture the environmental noise with as little contamination of the audio of interest (e.g., from the center of the second field of view circle 620) as possible. The noise beamformer generates a noise beamformer signal that captures acoustic signals that are not in the direction of the sound to be enhanced.

In one embodiment, the neural network 320 to receive the plurality of acoustic signals to generate a noise reference signal. In this embodiment, the beamformer unit 530 receives the noise reference signal and generates the target beamformer signal and the noise beamformer signal using the plurality of acoustic signals and the noise reference signal.

The target enhancer 540 determines the second field of view circle 620 corresponding to the zoom area 420 of the video content. In one embodiment, the target enhancer 530 determines the location and direction of the zoom area 420 with respect to the first field of view 610. The target enhancer 540 may transmit data including the second field of view circle 620 to the beamformer unit 530 in order for the beamformer unit 530 to direct the target beamformer and the noise beamformer accordingly. The target enhancer receives the target beamformer signal and the noise beamformer signal and generates a target enhanced signal associated with the zoom area 420 of the video content using the target beamformer signal and the noise beamformer signal. In one embodiment, the target enhancer 540 generates the target enhanced signal by spectrally subtracting the noise beamformer signal from the target enhanced signal.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 7:
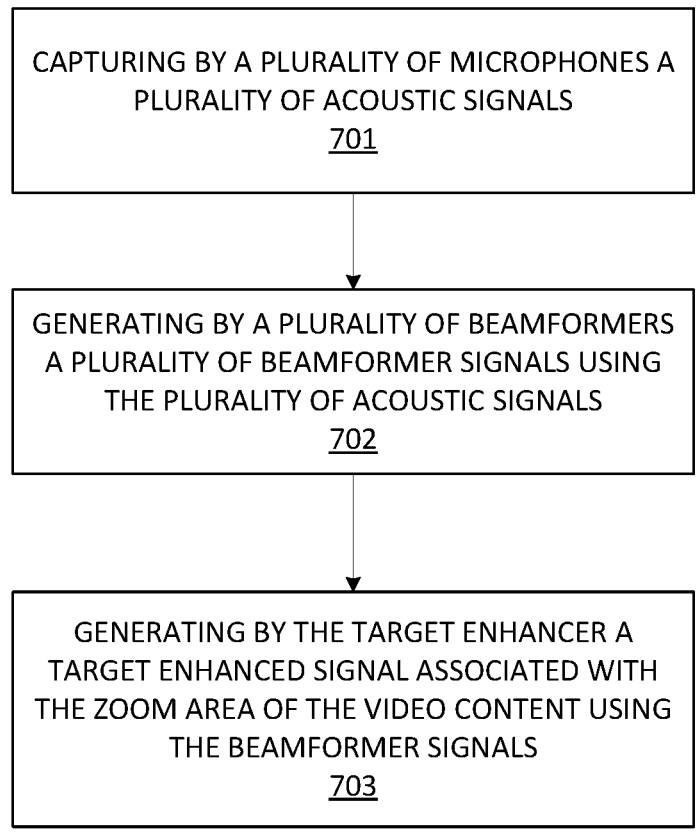
FIG. 7 is a flow diagram of an example method for performing acoustic zooming according to one embodiment of the invention.

FIG. 7 is a flow diagram of an example method for performing acoustic zooming according to one embodiment of the invention. Method starts with a plurality of microphones capturing a plurality of acoustic signals associated with a video content in Block 701. At Block 702, a plurality of beamformers generate a plurality of beamformer signals using the plurality of acoustic signals. The beamformer signals may correspond respectively to a plurality of tiles of the video content. Each of the beamformers may be respectively directed to a center of each of the tiles. At Block 703, a target enhancer generates a target enhanced signal using the beamformer signals. The target enhanced signal may be associated with a zoom area of the video content. In one embodiment, the target enhancer generates the target enhanced signal in Block 703 by identifying the tiles respectively having at least portions that are included in the zoom area, selecting the beamformer signals corresponding to the identified tiles, and combining the selected beamformer signals to generate the target enhanced signal. In one embodiment, combining the selected beamformer signals includes determining proportions for each of the identified tiles in relation to the zoom area and combining the selected beamformer signals based on the proportions to generate the target enhanced signal.

Figure 8:
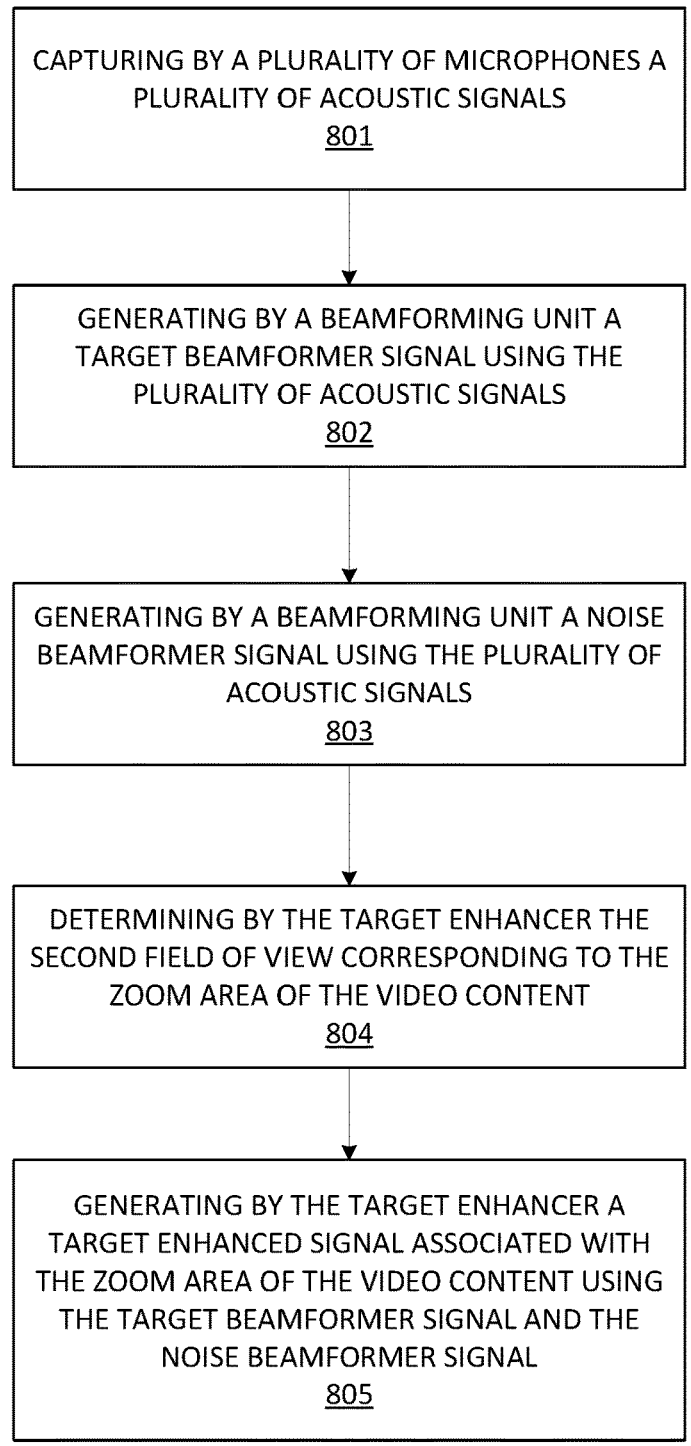
FIG. 8 is a flow diagram of an example method for performing acoustic zooming according to one embodiment of the invention.

FIG. 8 is a flow diagram of an example method for performing acoustic zooming according to one embodiment of the invention. Method starts with a plurality of microphones capturing a plurality of acoustic signals at Block 801. The first field of view of a video content may be associated with the plurality of acoustic signals. At Block 802, a target beamformer generates a target beamformer signal using the plurality of acoustic signals. The target beamformer is directed at a center of a second field of view corresponding to a zoom area of the video content. At Block 803, a noise beamformer generates a noise beamformer signal using the plurality of acoustic signals. The noise beamformer is directed at the first field of view and has a null directed at the center of the second field of view. At Block 804, a target enhancer determines the second field of view corresponding to the zoom area of the video content and at Block 805, generates a target enhanced signal associated with the zoom area of the video content using the target beamformer signal and the noise beamformer signal. In one embodiment, the target enhancer generating the target enhanced signal includes spectrally subtracting the noise beamformer signal from the target enhanced signal.

Software Architecture

Figure 9:
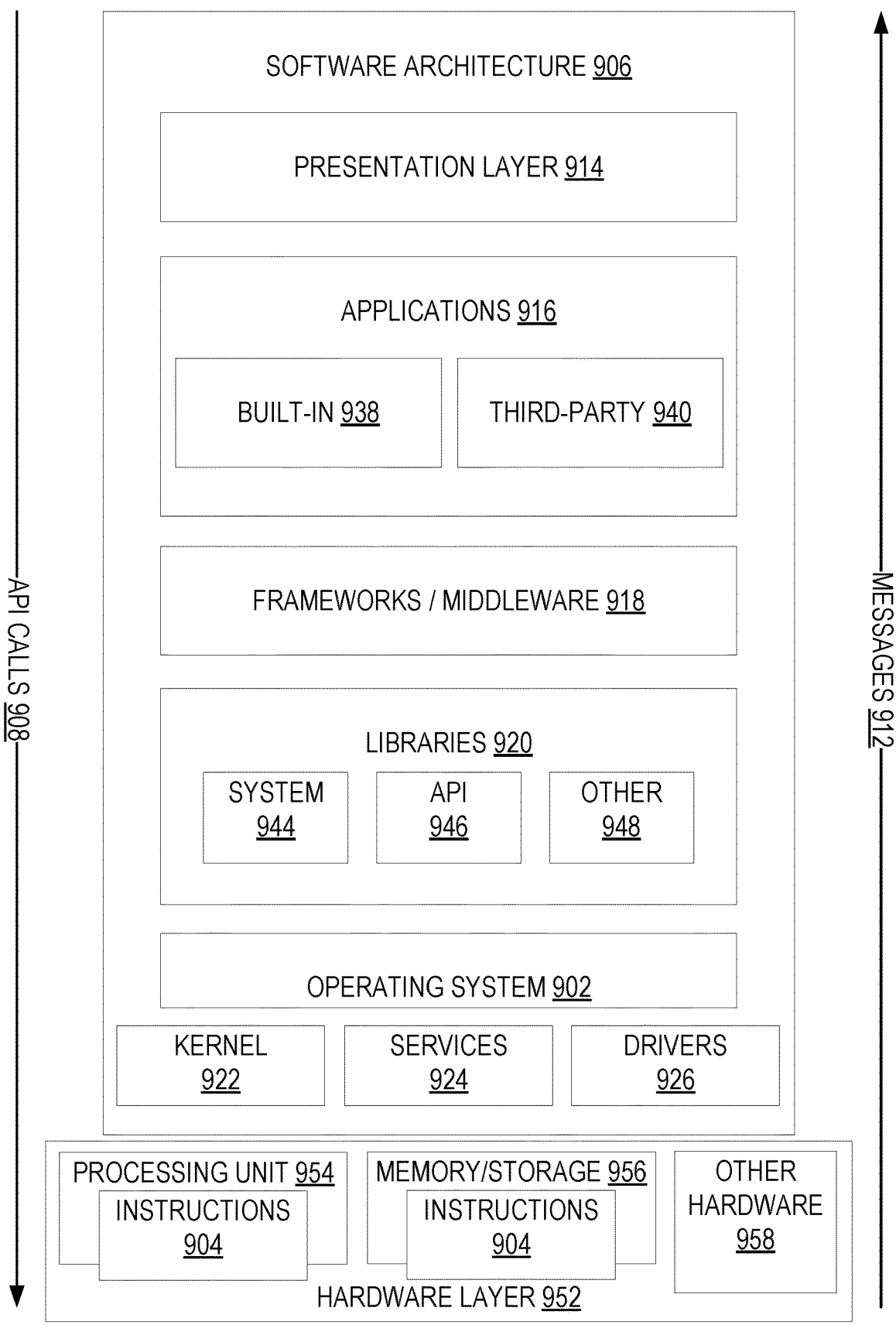
FIG. 9 is a block diagram illustrating a representative software architecture, which may be used in conjunction with various hardware architectures herein described.

FIG. 9 is a block diagram illustrating an exemplary software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components and so forth described herein. The hardware layer 952 also includes memory or storage modules memory/storage 956, which also have executable instructions 904. The hardware layer 952 may also comprise other hardware 958.

As used herein, the term "component" may refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 9, the software architecture 906 may be conceptualized as a stack of layers where each layer provides particular functionality. For example, the software architecture 906 may include layers such as an operating system 902, libraries 920, applications 916 and a presentation layer 914. Operationally, the applications 916 or other components within the layers may invoke application programming interface (API) API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924 and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 or other components or layers. The libraries 920 provide functionality that allows other software components to perform tasks in an easier fashion than to interface directly with the underlying operating system 902 functionality (e.g., kernel 922, services 924 or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 or other software components/modules, some of which may be specific to a particular operating system 902 or platform.

The applications 916 include built-in applications 938 or third-party applications 940. Examples of representative built-in applications 938 may include, but are not limited to, a contacts application, a browser application, a book reader application, a location application, a media application, a messaging application, or a game application. Third-party applications 940 may include an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924 or drivers 926), libraries 920, and frameworks/middleware 918 to create user interfaces to interact with users of the system. Alternatively, or additionally, in some systems interactions with a user may occur through a presentation layer, such as presentation layer 914. In these systems, the application/component "logic" can be separated from the aspects of the application/component that interact with a user.

Figure 10:
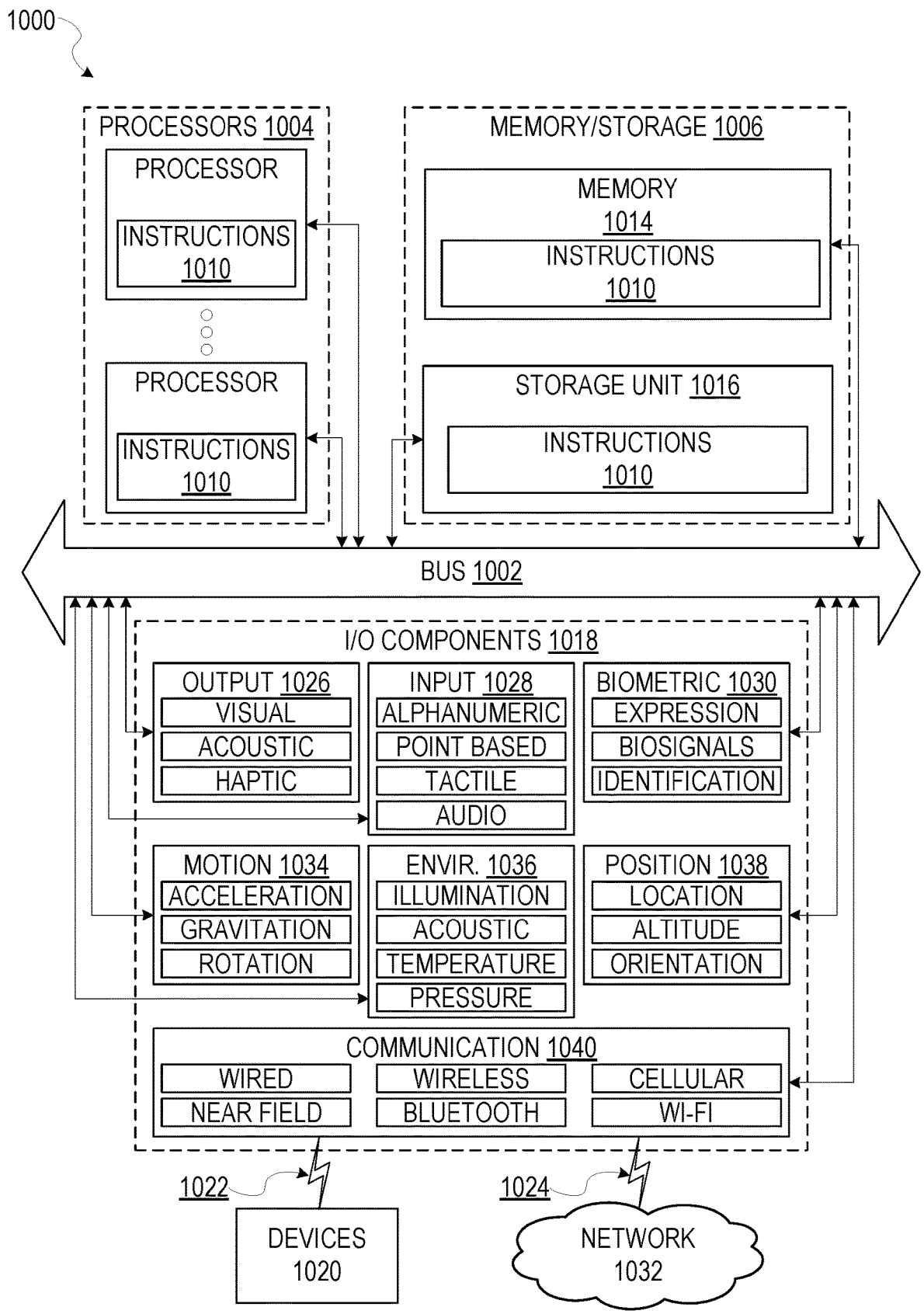
FIG. 10 is a block diagram illustrating components of a machine, according to some exemplary embodiments, able to read instructions from a machine-readable medium (e.g., a machine-readable storage medium) and perform any one or more of the methodologies discussed herein.

FIG. 10 is a block diagram illustrating components (also referred to herein as "modules") of a machine 1000, according to some exemplary embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 1018 may include a wide variety of components to provide a user interface for receiving input, providing output, producing output, transmitting information, exchanging information, capturing measurements, and so on. The specific I/O components 1018 that are included in the user interface of a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various exemplary embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like. The input components 1028 may also include one or more image-capturing devices, such as a digital camera for generating digital images or video.

In further exemplary embodiments, the I/O components 1018 may include biometric components 1030, motion components 1034, environmental environment components 1036, or position components 1038, as well as a wide array of other components. One or more of such components (or portions thereof) may collectively be referred to herein as a "sensor component" or "sensor" for collecting various data related to the machine 1000, the environment of the machine 1000, a user of the machine 1000, or a combination thereof.

For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 may include acceleration sensor components (e.g., accelerometer), gravitation sensor components, velocity sensor components (e.g., speedometer), rotation sensor components (e.g., gyroscope), and so forth. The environment components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a Global Position system (GPS) receiver component), altitude sensor components (e.g., altimeters or barometers that detect air pressure from which altitude may be derived), orientation sensor components (e.g., magnetometers), and the like. For example, the location sensor component may provide location information associated with the system 1000, such as the system's 1000 GPS coordinates or information regarding a location the system 1000 is at currently (e.g., the name of a restaurant or other business).

Communication may be implemented using a wide variety of technologies. The I/O components 1018 may include communication components 1040 operable to couple the machine 1000 to a network 1032 or devices 1020 via coupling 1022 and coupling 1024 respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A system for performing acoustic zooming comprising:
   a plurality of microphones to generate a plurality of acoustic signals, wherein a video content is associated with the plurality of acoustic signals;
   a plurality of beamformers
      to receive the plurality of acoustic signals, and
      to generate a plurality of beamformer signals corresponding respectively to a plurality of tiles of the video content, wherein each of the beamformers is respectively directed to a center of each of the tiles; and
   a target enhancer
      to receive the plurality of beamformer signals, and
      to generate a target enhanced signal associated with a zoom area of the video content, wherein generating the target enhanced signal includes:
         identifying the tiles respectively having at least portions that are included in the zoom area,
         selecting the beamformer signals corresponding to the identified tiles, and
         combining the selected beamformer signals to generate the target enhanced signal.

2. The system of claim 1, wherein the target enhancer combining the selected beamformer signals to generate the target enhanced signal further comprises:
   determining proportions for each of the identified tiles in relation to the zoom area; and
   combining the selected beamformer signals based on the proportions to generate the target enhanced signal.

3. The system of claim 2, wherein combining the selected beamformer signals based on the proportions to generate the target enhanced signal further comprises:
   spectrally adding the selected beamformer signals based on the proportions.

4. The system of claim 1, further comprising:
   a neural network to receive the plurality of acoustic signals to generate a noise reference signal,
   wherein a plurality of beamformers receive the noise reference signal and generate the plurality of beamformer signals using the plurality of acoustic signals and the noise reference signal.

5. The system of claim 1, further comprising:
   a time-frequency transformer to receive the plurality of acoustic signals and transform the plurality of acoustic signals from a time domain to a frequency domain; and
   a frequency-time transformer to receive the target enhanced signal and transform the target enhanced signal from the frequency domain to the time domain.

6. The system of claim 1, further comprising:
   a camera to capture the video content.

7. The system of claim 1, wherein the tiles of video content are equally-shaped tiles having an angular width of at least 10 degrees.

8. A method for performing acoustic zooming comprising:
   capturing, by a plurality of microphones, a plurality of acoustic signals associated with a video content;
   generating, by a plurality of beamformers, a plurality of beamformer signals using the plurality of acoustic signals, wherein the beamformer signals correspond respectively to a plurality of tiles of the video content, wherein each of the beamformers is respectively directed to a center of each of the tiles; and
   generating, by a target enhancer, a target enhanced signal using the beamformer signals, wherein the target enhanced signal is associated with a zoom area of the video content, wherein generating the target enhanced signal includes:
      identifying the tiles respectively having at least portions that are included in the zoom area,
      selecting the beamformer signals corresponding to the identified tiles, and
      combining the selected beamformer signals to generate the target enhanced signal.

9. The method of claim 8, wherein combining the selected beamformer signals to generate the target enhanced signal further comprises:
   determining proportions for each of the identified tiles in relation to the zoom area; and
   combining the selected beamformer signals based on the proportions to generate the target enhanced signal.

10. The method of claim 9, wherein combining the selected beamformer signals based on the proportions to generate the target enhanced signal further comprises:
    spectrally adding the selected beamformer signals based on the proportions.

11. The method of claim 8, further comprising:
    receiving, by a neural network, the plurality of acoustic signals to generate a noise reference signal, receiving, by the beamformers, the noise reference signal, and generating by the beamformers, the plurality of beamformer signals using the plurality of acoustic signals and the noise reference signal.

12. The method of claim 8, wherein the tiles of video content are equally-shaped tiles having an angular width of at least 10 degrees.

13. A computer-readable storage medium having stored thereon instructions, when executed by a processor, causes the processor to perform a method for performing acoustic zooming comprising:

receiving from a plurality of microphones a plurality of acoustic signals associated with a video content;

generating, using a plurality of beamformers, a plurality of beamformer signals based on the plurality of acoustic signals, wherein the beamformer signals correspond respectively to a plurality of tiles of the video content, wherein each of the beamformers is respectively directed to a center of each of the tiles; and generating a target enhanced signal using the beamformer signals, wherein the target enhanced signal is associated with a zoom area of the video content, wherein generating the target enhanced signal includes:

identifying the tiles respectively having at least portions that are included in the zoom area, selecting the beamformer signals corresponding to the identified tiles, and combining the selected beamformer signals to generate the target enhanced signal.

14. The computer-readable storage medium of claim 13, wherein combining the selected beamformer signals to generate the target enhanced signal further comprises:

determining proportions for each of the identified tiles in relation to the zoom area; and combining the selected beamformer signals based on the proportions to generate the target enhanced signal.

15. The computer-readable storage medium of claim 13, wherein the processor to perform a method further comprising:

generating using a neural network a noise reference signal based on the plurality of acoustic signals;

wherein the plurality of beamformer signals is generated using the plurality of acoustic signals and the noise reference signal.

16. The computer-readable storage medium of claim 13, wherein the processor to perform a method further comprising:

transforming the plurality of acoustic signals from a time domain to a frequency domain; and transforming the target enhanced signal from the frequency domain to the time domain.

17. A system for performing acoustic zooming comprising:

a plurality of microphones to generate a plurality of acoustic signals, wherein a first field of view of a video content is associated with the plurality of acoustic signals;

a plurality of beamformers to receive the plurality of acoustic signals, the plurality of beamformers including a target beamformer and a noise beamformer, wherein the target beamformer is directed at a center of a second field of view corresponding to a zoom area of the video content and generates a target beamformer signal, and the noise beamformer is directed at the first field of view, has a null directed at the center of the second field of view, and generates a noise beamformer signal; and a target enhancer to determine the second field of view corresponding to the zoom area of the video content, to receive the target beamformer signal and the noise beamformer signal, and to generate a target enhanced signal associated with the zoom area of the video content using the target beamformer signal and the noise beamformer signal.

18. The system of claim 17, wherein the target enhancer to generate the target enhanced signal includes spectrally subtracting the noise beamformer signal from the target enhanced signal.

19. The system of claim 17, further comprising:

a neural network to receive the plurality of acoustic signals to generate a noise reference signal, wherein the plurality of beamformers receive the noise reference signal and generates the target beamformer signal and the noise beamformer signal using the plurality of acoustic signals and the noise reference signal.

20. The system of claim 17, further comprising:

a time-frequency transformer to receive the plurality of acoustic signals and transform the plurality of acoustic signals from a time domain to a frequency domain; and a frequency-time transformer to receive the target enhanced signal and transform the target enhanced signal from the frequency domain to the time domain.

* * * * *